(12) United States Patent
Wang et al.

(10) Patent No.: US 12,423,427 B2
(45) Date of Patent: Sep. 23, 2025

(54) METHOD OF DETECTING ANDROID MALWARE BASED ON HETEROGENEOUS GRAPH AND APPARATUS THEREOF

(71) Applicant: Beihang University, Beijing (CN)

(72) Inventors: Tianbo Wang, Beijing (CN); Mengyao Liu, Beijing (CN); Chunhe Xia, Beijing (CN); Liqun Yang, Beijing (CN)

(73) Assignee: Beihang University, Beijing (CN)

( * ) Notice: Subject to any disclaimer, the term of this patent is extended or adjusted under 35 U.S.C. 154(b) by 112 days.

(21) Appl. No.: 18/398,453

(22) Filed: Dec. 28, 2023

(65) Prior Publication Data
US 2024/0241954 A1 Jul. 18, 2024

(30) Foreign Application Priority Data
Jan. 5, 2023 (CN) .......................... 202310013951.1

(51) Int. Cl.
*G06F 21/56* (2013.01)
(52) U.S. Cl.
CPC ................................ *G06F 21/566* (2013.01)
(58) Field of Classification Search
CPC .... G06F 21/566; G06F 21/562; G06F 21/563; G06F 8/53; G06F 16/9024; Y02D 10/00; G06N 3/04
See application file for complete search history.

(56) References Cited

U.S. PATENT DOCUMENTS

| | | | | |
|---|---|---|---|---|
| 11,025,649 B1* | 6/2021 | Bilge | ..................... | G06F 21/566 |
| 2016/0057159 A1* | 2/2016 | Yin | ....................... | H04L 63/145 |
| | | | | 726/23 |
| 2020/0137083 A1* | 4/2020 | Chen | ................... | G06F 16/9024 |

OTHER PUBLICATIONS

Yiming Hei, et al. Hawk: Rapid Android Malware Detection through Heterogeneous Graph Attention Networks, IEEE, pp. 1-14 (Year: 2021).*

* cited by examiner

*Primary Examiner* — Izunna Okeke
(74) *Attorney, Agent, or Firm* — Dorsey & Whitney LLP

(57) ABSTRACT

A method of detecting Android malware based on a heterogeneous graph and an apparatus thereof are provided, including: constructing a target heterogeneous graph according to entities and entity relationship information extracted from an application to be tested; determining a KL distance between any two meta-paths, and taking the meta-paths in which the KL distance is greater than a preset threshold as a plurality of finally selected meta-paths; carrying out, by RBM, feature fusion on the plurality of meta-paths, and adjusting, by an automatic encoder, fusion parameters of initial fusion vectors to meet a predetermined condition to obtain a plurality of fusion feature vectors; inputting the plurality of fusion feature vectors into a trained Deep Neural Network (DNN) for classification to obtain a final classification result, and determining whether the application to be tested is Android malware according to the final classification result.

17 Claims, 5 Drawing Sheets

METHOD OF DETECTING ANDROID MALWARE BASED ON HETEROGENEOUS GRAPH AND APPARATUS THEREOF

CROSS-REFERENCE TO RELATED APPLICATION

This patent application claims the benefit and priority of Chinese Patent Application No. 202310013951.1 filed with the China National Intellectual Property Administration on Jan. 5, 2023, the disclosure of which is incorporated by reference herein in its entirety as part of the present application.

TECHNICAL FIELD

The present disclosure relates to the technical field of network security, in particular to a method of detecting Android malware based on a heterogeneous graph and an apparatus thereof.

BACKGROUND

Android is an open source software stack based on Linux, which is created for all kinds of mobile devices and models with Java as the main development language. Since Google released the Android operating system for the first time in 2007, the Android operating system has become the operating system with the highest market share of mobile devices due to its openness, free property and good operating experience. The widespread use of the Android operating system not only brings convenience to legitimate users, but also attracts many lawbreakers to develop and spread malware on the Android platform. With the explosive growth of the number of applications and the complexity and diversity of functions, security issues have become increasingly prominent, and the wanton spread of malware has brought huge security risks to legitimate users.

Android Malware is software that is deliberately designed to damage mobile devices, servers, clients or networks, including computer viruses, worms, Trojan horses, ransomware, spyware, adware, rogue software, threatening software, etc., which is one of the main security threats of the Android platform. The existence of malware has seriously endangered the data and privacy security of legitimate users under the Android platform. In order to cope with the evolution of Android malware and protect legitimate users from the attack of Android malware, it is necessary to detect and prevent the malware on the Android system.

In the related technology, the key features are extracted by using the method based on machine learning and vectors are constructed to characterize each application software, which will be input into the classification algorithm for learning and classification.

However, this method can only acquire the characteristic information of software source codes, but cannot acquire deep semantics intentionally hidden and evolved, and the varied malwares are hard to be effectively detected.

With the rise of graph representation learning, many security researchers turn their attention to graph representation learning, and express different application features by constructing graphs to obtain better classification results. By using a homogeneous or heterogeneous graph structure to represent the relationship between different entities, the application can be more richly depicted, and various relationships between different entities can be effectively mined. However, the entity relationship described in the current research has a low correlation with the malicious behavior, which is still easy to bypass detection by confusing or replacing. In addition, some studies input some user-sensitive information as features, and there is a risk of leakage.

SUMMARY

The present disclosure provides a method of detecting Android malware based on a heterogeneous graph and an apparatus thereof, which solves the problems that a malware detection method in the related technology cannot acquire deep semantics intentionally hidden and evolved, the varied malwares are hard to be effectively detected, the entity relationship has a low correlation with the malicious behavior, and missed detection or false detection are easy to occur. Malware is detected and classified, and the speed and accuracy of identifying malware are improved.

The embodiment of a first aspect of the present disclosure provides a method of detecting Android malware based on a heterogeneous graph, including the following steps: acquiring a application to be tested, and constructing a target heterogeneous graph according to entities and entity relationship information extracted from the application to be tested; determining a Kullback-Leibler (KL) distance between any two meta-paths based on the target heterogeneous graph, and taking the meta-paths in which the KL distance between any two meta-paths is greater than a preset threshold as a plurality of finally selected meta-paths; carrying out, by Restricted Boltzmann Machine (RBM), feature fusion on the plurality of meta-paths, and adjusting, by an automatic encoder (AE), fusion parameters of initial fusion vectors to meet a predetermined condition to obtain a plurality of fusion feature vectors; inputting the plurality of fusion feature vectors into a trained Deep Neural Network (DNN) for classification to obtain a final classification result, and determining whether the application to be tested is Android malware according to the final classification result.

Optionally, the trained DNN is trained as follows: acquiring a plurality of application samples, and constructing target heterogeneous graphs according to entities and entity relationship information extracted from the application samples to be tested; determining a Kullback-Leibler (KL) distance between any two meta-paths based on the target heterogeneous graphs, and taking the meta-paths in which the KL distance between any two meta-paths is greater than a preset threshold as a plurality of finally selected meta-paths; carrying out, by Restricted Boltzmann Machine (RBM), feature fusion on the plurality of meta-paths, and adjusting, by an automatic encoder, fusion parameters of initial fusion vectors to meet a predetermined condition to obtain a plurality of fusion feature vectors, training a DNN with the plurality of fusion feature vectors based on a predetermined classification training strategy to obtain the trained DNN.

Optionally constructing a target heterogeneous graph according to entities and entity relationship information extracted from the application to be tested includes: decoding and/or decompiling the application to be tested to obtain a smali file and an AndroidManifest.xml configuration file; based on a preset regular matching strategy, extracting Application Programming Interface (API) entities and information of packages to which each API entity belongs from the smali file, and extracting hardware entity information and permission entity information declared by software from the AndroidManifest.xml configuration file by matching uses-feature and uses-permission; and constructing the target heterogeneous graph based on the API entities, the information of packages to which each API entity belongs, hardware entity information and permission entity information.

Optionally determining a KL distance between any two meta-paths includes: calculating a transition probability of a first meta-path and a transition probability of a second meta-path in any two meta-paths based on a preset transition probability calculation formula; and calculating the KL distance between any two meta-paths according to the transition probability of the first meta-path and the transition probability of the second meta-path based on a preset KL distance calculation formula.

Optionally the preset transition probability calculation formula is:

$$P_{xy} = \frac{\exp(S_{xy}^m)}{\sum_{k=1}^{n} \exp(S_{xk}^m)}, x \neq y,$$

where x and y are both target nodes, $$S_{xy}^m = \frac{2 \times |\mathcal{P}_{xy}^{(m)}|}{|\mathcal{P}_{xx}^{(m)}| + |\mathcal{P}_{yy}^{(m)}|}, |\mathcal{P}_{xy}^{(m)}|$$

is the number of meta-paths m between two peer objects x and y, and n and k are both positive integers, the preset KL distance calculation formula is:

$$KL(p_x \| q_x) = \Sigma_{x \neq y} p_{xy} \log \frac{p_{xy}}{q_{xy}},$$

where $q_x$ denotes the probability distribution of the first meta-path, $q_x = [q_{x1}, q_{x2}, \ldots, q_{xn}]^T$, and $p_x$ denotes the probability distribution of the second meta-path $p_x = [p_{x1}, p_{x2}, \ldots, p_{xn}]^T$.

Optionally the preset condition is:

$$\min \text{Loss} = \Sigma_{i=1}^{n} |x_{\mathcal{P}_i}^{(0)} - x_{\mathcal{P}_i}^{(reconstruct)}|_2^2,$$

where $x_{\mathcal{P}_i}^{(0)}$ is an original layer feature vector, and $x_{\mathcal{P}_i}^{(reconstruct)}$ is a feature vector reconstructed and decoded by the automatic encoder.

The embodiment of a second aspect of the present disclosure provides an apparatus of detecting Android malware based on a heterogeneous graph, including: a constructing module, which is configured to acquire an application to be tested, and construct a target heterogeneous graph according to entities and entity relationship information extracted from the application to be tested; a determining module, which is configured to determine a Kullback-Leibler (KL) distance between any two meta-paths based on the target heterogeneous graph, and take the meta-paths in which the KL distance between any two meta-paths is greater than a preset threshold as a plurality of finally selected meta-paths; and a detecting module, which is configured to carry out, by Restricted Boltzmann Machine (RBM), feature fusion on the plurality of meta-paths, and adjust, by an automatic encoder, fusion parameters of initial fusion vectors to meet a predetermined condition to obtain a plurality of fusion feature vectors; input the plurality of fusion feature vectors into a trained Deep Neural Network (DNN) for classification to obtain a final classification result, and determine whether the application to be tested is Android malware according to the final classification result.

Optionally the constructing module is further configured to: decode and/or decompile the application to be tested to obtain a smali file and an AndroidManifest.xml configuration file; based on a preset regular matching strategy, extract Application Programming Interface (API) entities and information of packages to which each API entity belongs from the smali file, and extract hardware entity information and permission entity information declared by software from the AndroidManifest.xml configuration file by matching uses-feature and uses-permission; construct the target heterogeneous graph based on the API entities, the information of packages to which each API entity belongs, hardware entity information and permission entity information.

Optionally the determining module is further configured to: calculate a transition probability of a first meta-path and a transition probability of a second meta-path in any two meta-paths based on a preset transition probability calculation formula; calculate the KL distance between any two meta-paths according to the transition probability of the first meta-path and the transition probability of the second meta-path based on a preset KL distance calculation formula.

Optionally the preset transition probability calculation formula is:

$$P_{xy} = \frac{\exp(S_{xy}^m)}{\sum_{k=1}^{n} \exp(S_{xk}^m)}, x \neq y,$$

where x and y are both target nodes, $$S_{xy}^m = \frac{2 \times |\mathcal{P}_{xy}^{(m)}|}{|\mathcal{P}_{xx}^{(m)}| + |\mathcal{P}_{yy}^{(m)}|}, |\mathcal{P}_{xy}^{(m)}|$$

is the number of meta-paths m between two peer objects x and y, and n and k are both positive integers, the preset KL distance calculation formula is:

$$KL(p_x \| q_x) = \sum_{x \neq y} p_{xy} \log \frac{p_{xy}}{q_{xy}}$$

where $q_x = [q_{x1}, q_{x2}, \ldots, q_{xn}]^T$, $p_x = [p_{x1}, p_{x2}, \ldots, p_{xn}]^T$.

Optionally the preset condition is:
min $$\text{Loss} = \sum_{i=1}^{n} |x_{\mathcal{P}_i}^{(0)} - x_{\mathcal{P}_i}^{(reconstruct)}|_2^2$$

where $x_{\mathcal{P}_i}^{(0)}$ is an original layer feature vector, and $x_{\mathcal{P}_i}^{(reconstruct)}$ is a feature vector reconstructed and decoded by the automatic encoder.

The embodiment of a third aspect of the present disclosure provides an electronic device, including a memory, a processor and a computer program stored in the memory and operable on the processor, where the processor executes the program to implement the method of detecting Android malware based on the heterogeneous graph as described in the above embodiment.

The embodiment of a fourth aspect of the present disclosure provides a non-transitory computer-readable storage medium, on which a computer program is stored, where the program is executed by a processor to implement the method of detecting Android malware based on the heterogeneous graph as described in the above embodiment.

In the present disclosure, a target heterogeneous graph is constructed according to entities and entity relationship information extracted from a application to be tested, the meta-paths in which the KL distance between any two meta-paths is greater than a preset threshold are determined as a plurality of finally selected meta-paths, RBM feature fusion is carried out on the plurality of meta-paths, fusion parameters of initial fusion vectors are adjusted to meet a preset condition based on a preset automatic encoder to obtain a plurality of fusion feature vectors, a preset DNN classification training strategy is used to study and train the plurality of fusion feature vectors to obtain a final classification result, and Android malware detection is carried out according to the final classification result. Therefore, the problems that a malware detection method in the related technology cannot acquire deep semantics intentionally hidden and evolved, the varied malwares are hard to be effectively detected, the entity relationship has a low correlation with the malicious behavior, and missed detection or false detection are easy to occur are solved. The speed and accuracy of identifying malware are improved.

Additional aspect and advantages of that present disclosure will be set forth in part in the following description, and in part will be obvious from the following description, or may be learned by practice of the present disclosure.

BRIEF DESCRIPTION OF THE DRAWINGS

The above and/or additional aspects and advantages of the present disclosure will be apparent and understandable from the following description of embodiments taken in conjunction with the accompanying drawings, in which.

DETAILED DESCRIPTION OF THE EMBODIMENTS

Figure 1:
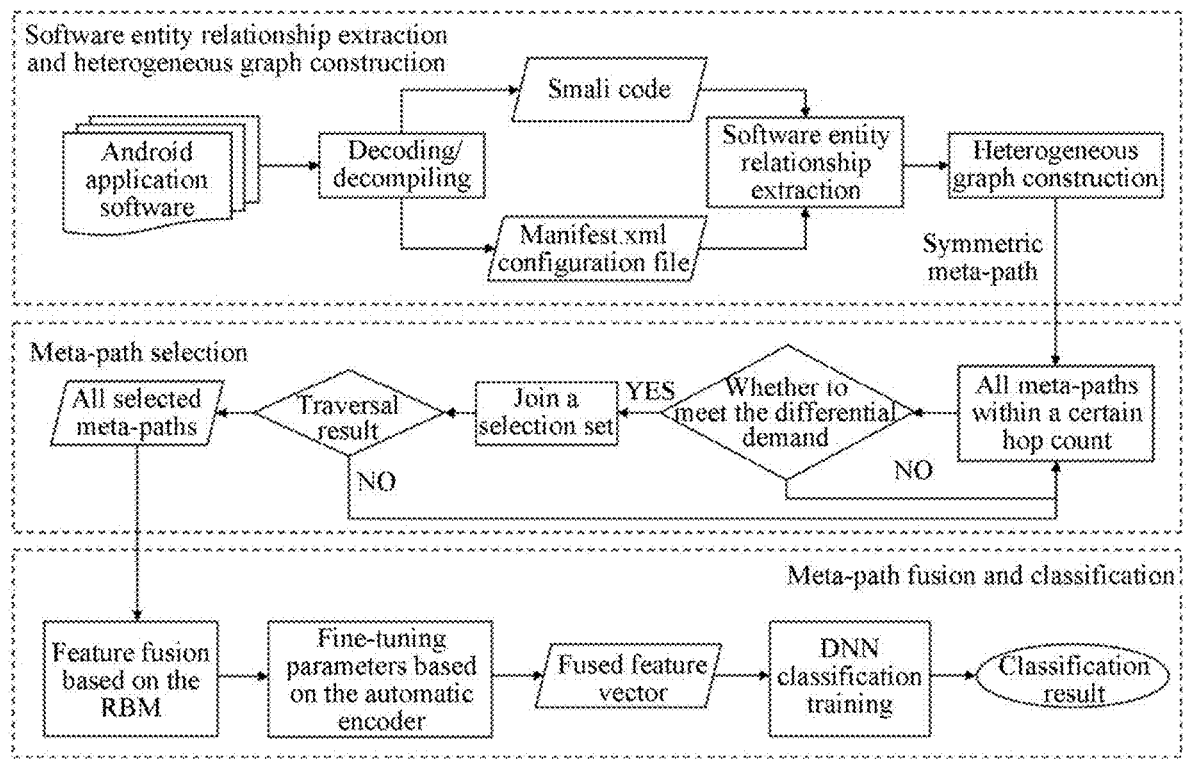
FIG. 1 is a flowchart of a method of detecting Android malware based on a heterogeneous graph according to an embodiment of the present disclosure.

Hereinafter, embodiments of the present disclosure will be described in detail, examples of which are illustrated in the accompanying drawings, where the same or similar reference numerals indicate the same or similar elements or elements having the same or similar functions throughout. The embodiments described below with reference to the attached drawings are exemplary and are intended to explain the present disclosure, rather than be construed as limitations of the present disclosure.

Hereinafter, a method of detecting Android malware based on a heterogeneous graph and an apparatus thereof in the embodiment of the present disclosure will be described with reference to the attached drawings. Aiming at the problems that the malware detection method in the related technology mentioned by the background technology cannot acquire deep semantics intentionally hidden and evolved, the varied malwares are hard to be effectively detected, the entity relationship has a low correlation with the malicious behavior, and missed detection or false detection are easy to occur, the present disclosure provides a method of detecting Android malware based on a heterogeneous graph. In this method, a target heterogeneous graph is constructed according to entities and entity relationship information extracted from a sample to be tested; the meta-paths in which the KL distance between any two meta-paths is greater than a preset threshold are determined as a plurality of finally selected meta-paths; RBM feature fusion is carried out on the plurality of meta-paths, fusion parameters of initial fusion vectors are adjusted to meet a preset condition based on a preset automatic encoder to obtain a plurality of fusion feature vectors, a preset DNN classification training strategy is used to study and train the plurality of fusion feature vectors to obtain a final classification result, and Android malware detection is carried out according to the final classification result. Therefore, the problems that the malware detection method in the related technology cannot acquire deep semantics intentionally hidden and evolved, the varied malwares are hard to be effectively detected, the entity relationship has a low correlation with the malicious behavior, and missed detection or false detection are easy to occur, are solved. And according to the method, malwares can be detected and classified, and the speed and accuracy of identifying malware are improved.

In this embodiment, the method of detecting Android malware based on the heterogeneous graph includes three parts: software entity relationship extraction and heterogeneous graph construction, meta-path selection, and fusion and classification of a plurality of meta-paths, in which the structure is shown in FIG. 1.

In order to better describe the malware behavior and deeply analyze the characteristics of the relationship between the software behavior implementation and the source code, the embodiment of the present disclosure defines three behavior semantics, namely execution semantics, functional semantics and program semantics.

For execution semantics, it aims to describe the one-step execution behavior in the Android application. In the field of malware detection, the key behaviors of applications can be classified into API invoke, permission request, hardware access, and API package association. Therefore, the embodiment of the present disclosure reconstructs these behaviors into graphs and merges these graphs into heterogeneous graphs for subsequent analysis.

For the functional semantics, it aims to describe the micro semantics of the Android application, that is, the semantics of each functional module. In the embodiment of the present disclosure, a plurality of one-step execution behaviors are combined into functional semantics, which is the basic unit of malware detection. Meta-paths are used here to describe the semantics at this level.

For program semantics, it aims to describe the macro semantics of the Android application. The Android application includes a plurality of independent functions, and in some embodiments consists of a plurality of independent functions, which together implements the overall behavior of the application. Therefore, a plurality of meta-paths are fused to acquire program semantics.

Figure 2:
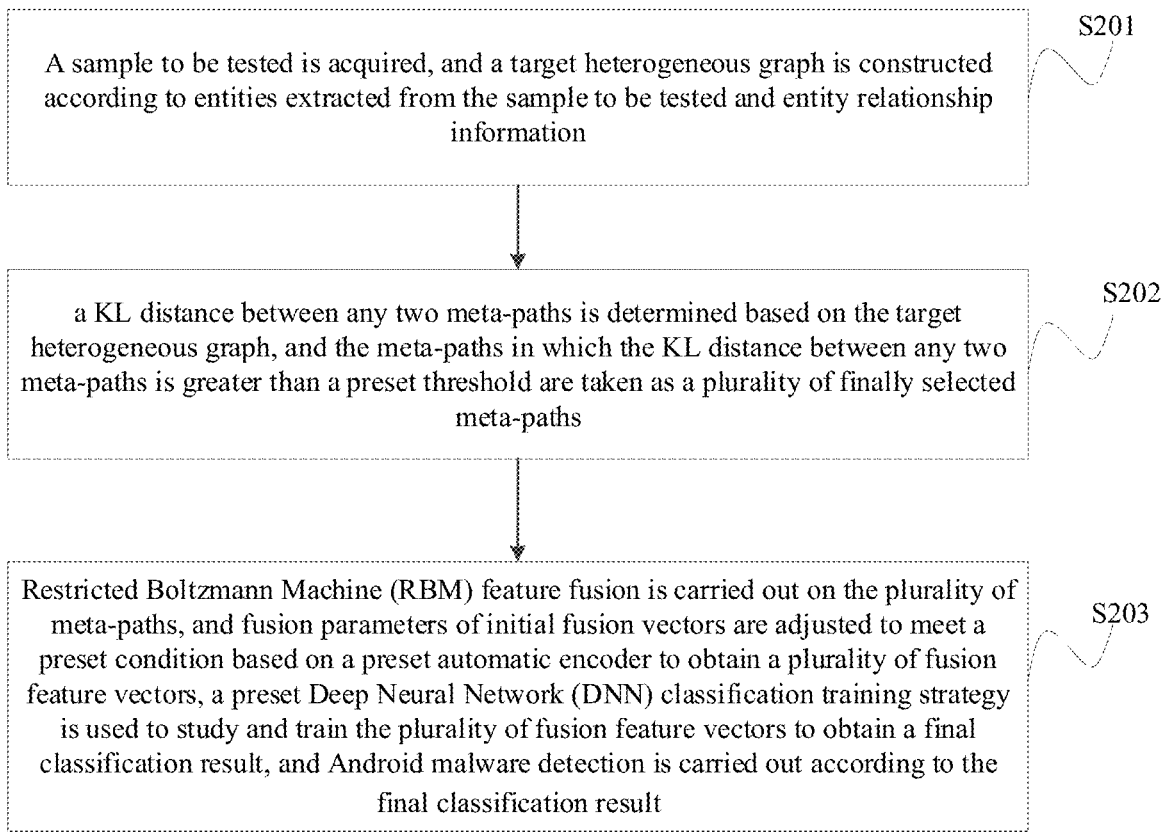
FIG. 2 is a flowchart of a method of detecting Android malware based on a heterogeneous graph according to an embodiment of the present disclosure.

Specifically, FIG. 2 is a flowchart of a method of detecting Android malware based on a heterogeneous graph according to an embodiment of the present disclosure.

As shown in FIG. 2, the method of detecting Android malware based on the heterogeneous graph includes the following Steps 201 and 203.

In Step S201, a sample to be tested is acquired, and a target heterogeneous graph is constructed according to entities and entity relationship information extracted from the sample to be tested.

Optionally, in some embodiments, a target heterogeneous graph is constructed according to entities and entity relationship information extracted from the sample to be tested, which includes: decoding and/or decompiling the sample to be tested to obtain a smali file and an AndroidManifest.xml configuration file; based on a preset regular matching strategy, extracting Application Programming Interface (API) entities and information of packages to which each API entity belongs from the smali file, and extracting hardware entity information and permission entity information declared by software from the AndroidManifest.xml configuration file by matching uses-feature and uses-permission; constructing the target heterogeneous graph based on the API entities, the information of packages to which each API entity belongs, hardware entity information and permission entity information.

Specifically, the software entity relationship extraction and the heterogeneous graph construction first decode and decompile the test samples by an Apktool tool, and acquire the smali file and the AndroidManifest.xml configuration file of all the intermediate codes.

Thereafter, because the smali code has a fixed syntax structure, the preset regular matching strategy is used. In the embodiment of the present disclosure, API invoke and information of packages to which each API belongs are extracted from the smali file through the preset regular matching strategy, and the sentence containing "-invoke" is searched in the code for extraction. Subsequently, the hardware information and permission information declared by software are extracted from the AndroidManifest.xml configuration file by matching "uses-feature" and "uses-permission".

Further, the embodiment of the present disclosure extracts five entities to represent the application characteristics.

(1) $Entity_{APP}$, which represents the software to be tested, is the core of similarity evaluation, and the relationship of all entities proceeds around the APP node.

(2) $Entity_{API}$ represents the API entity. Software developers achieve various software functions through encapsulated API interfaces, which can describe the semantic information of the Android application. When performing malicious operations, malware often uses some suspicious and sensitive API interfaces to achieve functions, such as reading and writing files, deleting files and so on. For API files under different Android versions, the association analysis is carried out according to the API files given by the authorities, the updated API and package information are replaced, and the API information that is not used any more is deleted.

(3) $Entity_{Package}$ represents a package entity. Package is an abstract module in the Android platform, through which API can be directly accessed. Generally speaking, files defined in a Package usually have similar functions. Malware usually uses different functions in the same Package to achieve the same function, thus avoiding detection.

(4) $Entity_{Hardware}$ represents a hardware entity. The Android application needs to request hardware support to achieve some functions. For example, android.hardware.camera and android.hardware.location.gps represent camera access and GPS positioning, respectively. To some extent, hardware invoke may bring more risks.

(5) $Entity_{Permission}$ represents the permission entity. A permission determines the specific operations that an application can perform at runtime and the related resources that the application is allowed to access. Under the Android platform, a permission is defined in the AndroidManifest.xml file, which contains four levels. Malware tends to apply for more permissions to achieve sensitive operations.

Different entities have different relationships and can express different semantic associations. Simple invoking features can only represent the execution behavior of Android, and attackers can bypass detection through simple replacement. Therefore, in order to improve the accuracy of model detection, based on domain knowledge and inherent relationship information, a variety of relationships between entities are established to further characterize the similarity of applications.

(1)<APP, API> indicates that the APP has invoked a specific API interface. The connection relationship between the APP and the API can effectively mine the behavior similarity between two APPs. If two APPs invoke many of the same APIs, the two APPs will eventually achieve the same function.

(2)<APP, hardware> indicates that the APP is allowed to invoke specific hardware. Malware tends to declare more hardware to achieve functions. The relationship between the APP and hardware can describe the similar invoking relationship between the application and the underlying hardware.

(3)<APP, permission> indicates that the APP is granted the specified permission. The declaration of the permission limits the content that the Android application can access in the running process. The relationship between the APP and the permission can mine the similarity of sensitive data that need to be accessed between two APPs.

(4)<API, package> indicates that the API is in a certain package. APIs in the same package generally cooperate to achieve the same function. For example, all APIs in the package "android.os.Binder" perform inter-process communication. Therefore, APIs belonging to the same package will have similar behaviors, so that the similarity relationship between the APIs can be constructed, and the mining ability of behavior similarity can be improved.

(5)<API, permission> indicates that the API needs a specific permission to complete the action. APIs with the same permission generally achieve similar functions. Therefore, the relationship between the API and permission can better mine the behavior of the API.

For the above five relationships, the definitions of the API, hardware and the permission are all given directly in the source code, the relationship between the API and the package can be obtained by splitting statements, and the relationship between the API and the permission can be extracted by analyzing the source code.

Figure 3:
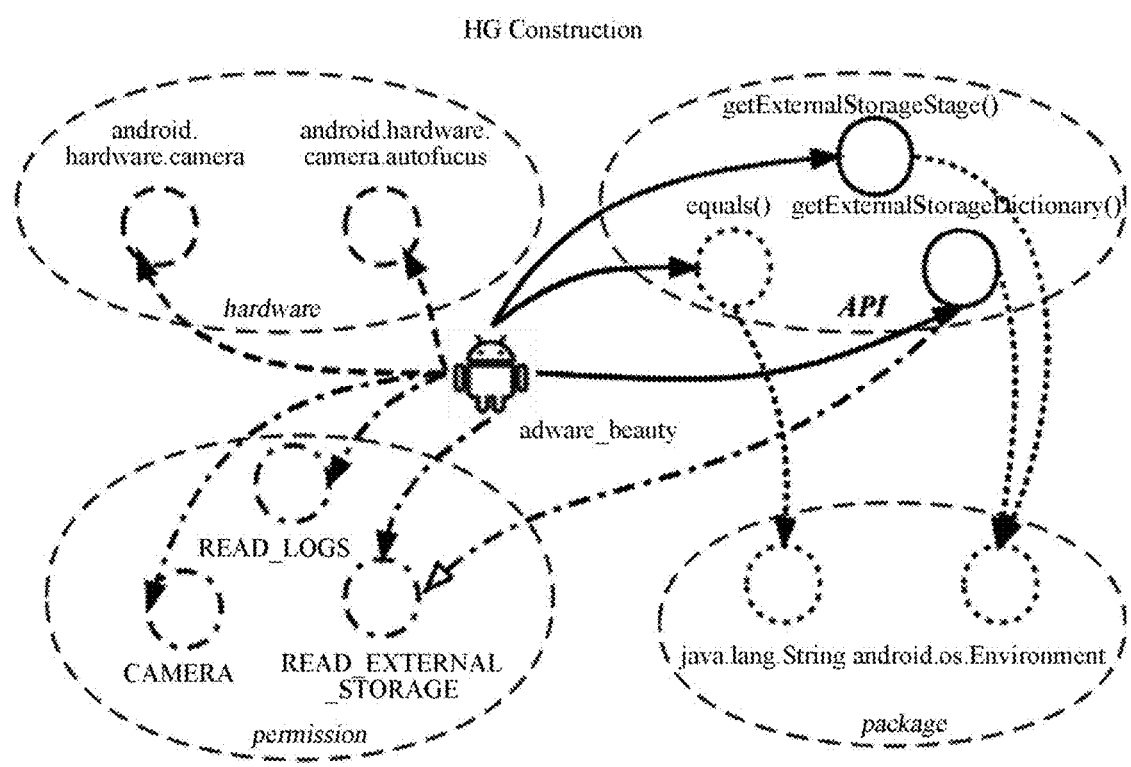
FIG. 3 is a schematic diagram of constructing a heterogeneous graph according to an embodiment of the present disclosure.

Further, according to the extracted entity and relationship information, the embodiment of the present disclosure constructs a target heterogeneous graph as shown in FIG. 3 to characterize the behaviors of different applications.

In order to effectively characterize the heterogeneous graph in the computer, the embodiment of the present disclosure also defines five adjacency matrices for representation. As shown in Table 1, the relationship matrix is used to represent the relationships between different entities, where A, H, Q, P and M represent the adjacency matrices of these five relationships. The rows and columns of the adjacency matrices correspond to different entities, respectively. If there is the above relationship between the two entities, the value is 1. If there is no association, the value is 0.

TABLE 1

| relationship | elements | description |
| --- | --- | --- |
| <APP, API> | $a_{ij} \in A$ | If $APP_i$ invokes $API_j$, $a_{ij} = 1$, otherwise $a_{ij} = 0$ |
| <APP, hardware> | $h_{ij} \in H$ | If $APP_i$ declares $hardware_j$, $h_{ij} = 1$, otherwise $h_{ij} = 0$ |
| <APP, permission> | $q_{ij} \in Q$ | If $APP_i$ requests $permission_j$, $q_{ij} = 1$, otherwise $q_{ij} = 0$ |
| <API, package> | $p_{ij} \in P$ | If $API_i$ belongs to $package_j$, $p_{ij} = 1$, otherwise $p_{ij} = 0$ |
| <API, permission> | $m_{ij} \in M$ | If $API_i$ needs $permission_j$, $m_{ij} = 1$, otherwise $m_{ij} = 0$ |

In Step S202, a KL distance between any two meta-paths is determined based on the target heterogeneous graph, and the meta-paths in which the KL distance between any two meta-paths is greater than a preset threshold are taken as a plurality of finally selected meta-paths.

Optionally, in some embodiments, a KL distance between any two meta-paths is determined, which includes: calculating a transition probability of a first meta-path and a transition probability of a second meta-path in any two meta-paths based on a preset transition probability calculation formula; calculating the KL distance between any two meta-paths according to the transition probability of the first meta-path and the transition probability of the second meta-path based on a preset KL distance calculation formula.

Optionally, in some embodiments, the preset transition probability calculation formula is:

$$P_{xy} = \frac{\exp(S_{xy}^m)}{\sum_{k=1}^{n} \exp(S_{xk}^m)}, x \neq y,$$

where x and y are both target nodes, $$S_{xy}^m = \frac{2 \times |\mathcal{P}_{xy}^{(m)}|}{|\mathcal{P}_{xx}^{(m)}| + |\mathcal{P}_{yy}^{(m)}|}, |\mathcal{P}_{xy}^{(m)}|$$

is the number of meta-paths m between two peer objects x and y, and n and k are both positive integers.

The preset KL distance calculation formula is:

$$KL(p_x \| q_x) = \sum_{x \neq y} p_{xy} \log \frac{p_{xy}}{q_{xy}},$$

where $q_x$ denotes the probability distribution of the first meta-path, $q_x = [q_{x1}, q_{x2}, \ldots, q_{xn}]^T$, and $p_x$ denotes the probability distribution of the second meta-path, $p_x = [p_{x1}, p_{x2}, \ldots, p_{xn}]^T$.

In this embodiment, the selection of meta-paths influences the quality of semantic acquisition. If there are few meta-paths to be selected, the semantic similarity between two nodes is insufficient, thus reducing the classification accuracy. If meta-paths to be selected are redundant, semantic extraction is repetitive, causing a waste of time and space and influence on the classification results. However, the manually selected meta-path needs enough domain knowledge and is greatly influenced by individual cognition. Therefore, it is very important to select the meta-paths quickly and effectively.

In the embodiment of the present disclosure, a pre-training method is used to select a plurality of meta-paths. Because the identified target is Android application software, only the App node is used as the target node.

It is assumed that there are n target nodes $v_1, v_2, \ldots, v_n$. First, the similarity of meta-paths $m \in \mathcal{P}$ used in two target nodes is defined according to PathSim:

$$S_{xy}^m = \frac{2 \times |\mathcal{P}_{xy}^{(m)}|}{|\mathcal{P}_{xx}^{(m)}| + |\mathcal{P}_{yy}^{(m)}|},$$

where $|\mathcal{P}_{xy}^{(m)}|$ is the number of meta-paths m between two peer objects x and y. When the similarity between two nodes is higher, the connection relationship between the two nodes is closer to the self-connection relationship.

Then, the similarity between different entities is defined as the transition probability, and the value of the probability is defined by the softmax (•) function. The transition probability from the target node x to the target node y under the meta-paths m is calculated according to the preset transition probability calculation formula.

$\Sigma_{y=1}^{n} P_{xy} = 1$. The higher the similarity between two entities, the greater the transition probability. Since the embodiment of the present disclosure only considers the transition probability between two different nodes, $P_{xx} = 0$ is additionally defined.

The transition probability effectively captures the structural information between the target nodes, which is also the different semantics represented by the meta-path. In order to make effective use of different semantic relations, the meta-path with large difference in the transition probability distribution should be selected. The meta-path with a close distribution is reduced to realize the effective selection of the meta-path. The KL distance can effectively measure the difference between two probability distributions.

The probability difference between two meta-paths should be calculated based on all target nodes. Therefore, the KL distances of all nodes are added. In order to effectively measure the difference of the probability distribution, a parameter λ (that is, a preset threshold) is defined. When the KL distance is less than λ, the semantics of the two meta-paths are considered redundant, and only the shorter meta-path is kept. When the KL distance between any two meta-paths is greater than λ, the meta-paths in which the KL distance is greater than a preset threshold are reserved as a plurality of finally selected meta-paths. Therefore, the number of meta-paths to be finally selected can be determined by λ:

$$\sum_{x=1}^{n} KL(p_x \| q_x) \geq \lambda, \forall m \in M_{select}.$$

In Step S203, RBM feature fusion is carried out on the plurality of meta-paths, and fusion parameters of initial fusion vectors are adjusted to meet a preset condition based on a preset automatic encoder to obtain a plurality of fusion feature vectors. A preset DNN classification training strategy is used to study and train the plurality of fusion feature vectors to obtain a final classification result, and Android malware detection is carried out according to the final classification result.

Optionally in some embodiments, the preset condition is:

$$\min \text{Loss} = \sum_{i=1}^{n} \left| x_{\mathcal{P}_i}^{(0)} - x_{\mathcal{P}_i}^{(reconstruct)} \right|_{2}^{2},$$

where $x_{\mathcal{P}_i}^{(0)}$ is an original layer feature vector, and $x_{\mathcal{P}_i}^{(reconstruct)}$ is a feature vector reconstructed and decoded by the automatic encoder.

Since different meta-paths have different semantics, it is difficult for a single type of meta-paths to effectively represent the overall behavior characteristics of the application, and it is easy to be hidden. In order to identify malware concurrently according to the semantic information provided by a plurality of meta-paths, it is necessary to fuse the semantic information of a plurality of meta-paths, so as to train together and improve the accuracy of software detection.

In the embodiment of the present disclosure, the fusion technology of a plurality of meta-paths based on the RBM and the preset automatic encoder is used to realize semantic fusion with less feature loss. Because all meta-paths are selected according to the difference of probability distributions, and the training purpose of the RBM is to reserve the probability distributions to the greatest extent, the RBM is selected for fusion. In addition, when the multi-level RBM is used for abstraction, some information loss may occur, and the automatic encoder can effectively ensure that there is less data loss before and after encoding. Therefore, the fusion technology of a plurality of meta-paths based on the RBM and the automatic encoder is proposed to realize the fusion of different meta-path information and improve the classification accuracy and the model speed.

First, the embodiment of the present disclosure separately performs two-layer RBM training on all selected meta-paths to acquire better hierarchical, compact and nonlinear semantic abstract information, so that the fusion can be better later.

Thereafter, another RBM is used to fuse a plurality of abstracted meta-path features, so as to obtain the initial fused vector $h^x$.

Figure 4:
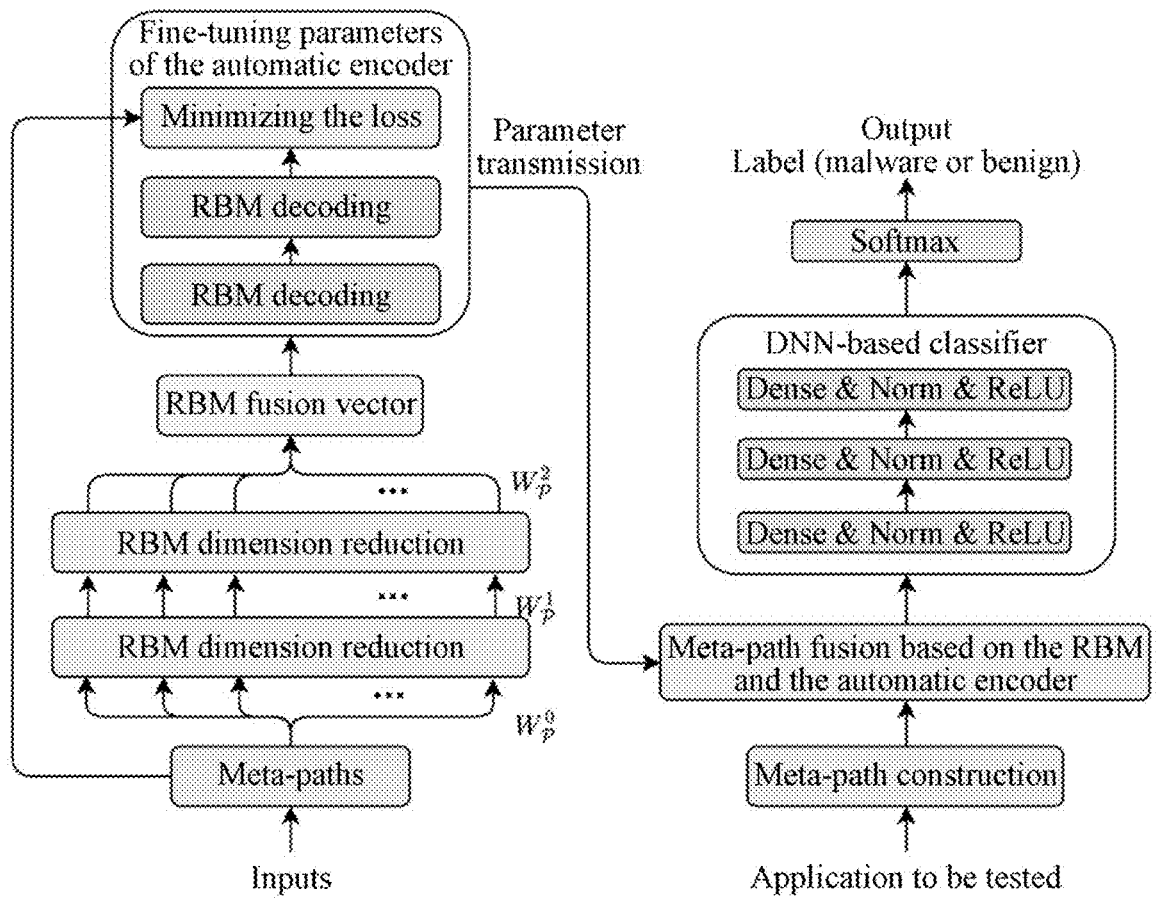
FIG. 4 is a flowchart of fusion of a plurality of meta-paths based on an RBM and an automatic encoder according to an embodiment of the present disclosure.

In this process, as shown in FIG. 4, the embodiment of the present disclosure trains each RBM separately to obtain the value of the parameter $W_{\mathcal{P}_n}$. GRBM is used for training between the input layer and the first RBM dimension reduction layer, and binary-binary RBM is used for training among the other layers. The coding function expression of each layer is:

$$x_{\mathcal{P}_n}^{(l+1)} = \sigma\left(W_{\mathcal{P}_n}^{(l)} x_{\mathcal{P}_n}^{(l)} + b_{\mathcal{P}_n}^{(l)}\right),$$

where $x_{\mathcal{P}_n}^{(l)}$ is a vector of an l-th layer under the meta-path $\mathcal{P}_n$, $W_{\mathcal{P}_n}^{(l)}$ is a connection weight matrix between the l-th layer and the l+1 layer, and $b_{\mathcal{P}_n}^{(l)}$ is a coding offset. In the whole meta-path fusion process, the optimization goal is to minimize the negative logarithm of the probability:

$$P(v|\theta) = \frac{1}{z(\theta)} \sum_{h} e^{-E(v,h|\theta)},$$

where θ represents model parameters, v represents visible layer data, h represents hidden layer data, E(v,h|θ) represents energy function, and z(θ) is the normalization factor, which indicates energy and all possible cases.

After the inter-layer training, a fusion parameter is acquired between every two layers. In order to further optimize the parameter value, the embodiment of the present disclosure constructs an Auto-Encoder for multi-layer training and fine-tuning of the parameter $W_{\mathcal{P}_n}^{(l)}$. The Auto-Encoder adds three decoding layers after the RBM fusion layer, and the decoding function can be denoted as:

$$\hat{x}_{\mathcal{P}_n}^{(l)} = \sigma\left(W_n^{(l)} \hat{x}_{\mathcal{P}_n}^{(l+1)} + c_{\mathcal{P}_n}^{(l)}\right). \tag{3.7}$$

Further, according to the embodiment of the present disclosure, fusion parameters of initial fusion vectors are adjusted to meet a preset condition based on a preset automatic encoder. That is, preset condition is such a condition that the loss of the input value and the reconstructed value is minimum:

$$\min \text{Loss} = \sum_{i=1}^{n} \left| x_{\mathcal{P}_i}^{(0)} - x_{\mathcal{P}_i}^{(reconstruct)} \right|_{2}^{2}.$$

The trained parameters are transmitted to a supervised learning classifier, so as to obtain a plurality of fusion feature vectors.

Finally, the embodiment of the present disclosure uses the preset DNN classification training strategy to learn and detect malware. Through the obtained fusion parameters, the vector representation of each application can be obtained. The DNN model including three hidden layers is used to learn and train all the training sample features, and each node is connected with all the nodes in the previous layer. The fully connected neural network can better fit the relationship between all the feature values, thus mining the deeper similarity relationship. After three layers of full connection, two output vectors can be obtained. And these two output vectors are fed into a softmax layer to compute the probabilities of being classified into benign or malware category. The category with the highest probability is considered as the final classification result.

Compared with the related art, the embodiment of the present disclosure has the following technical effects.

By analyzing the relationship between the Android software behavior and the source code, the embodiment of the present disclosure defines three hierarchical semantic information: execution semantics, functional semantics and program semantics. For the lack of functional semantics in the Android software behavior characterization, five kinds of entities and five kinds of relationships are extracted to construct a heterogeneous graphs to characterize the software behavior in a plurality of levels, which effectively realizes the in-depth characterization of the software behavior and improves the interpretability of features. Furthermore, the features in the heterogeneous graph are analyzed, and meta-paths are used to characterize the similarity relationship between different software. For the problem that semantic feature selection depends on manual guidance, a meta-path selection algorithm based on maximizing the difference of transition probability is proposed, which eliminates redundant and invalid meta-path features, improves the effectiveness of selecting features on classification, maximizes the reservation of features with different semantics, and increases the difficulty for malware to evade detection to some extent. For the problem that it is difficult to effectively fuse a plurality of meta-paths to improve the classification accuracy together, the software is considered to be classified by similarity relationship, and a fusion technology of a plurality of meta-paths based on the RBM and the automatic encoder is proposed, which effectively reserves the probability distribution relationship of different meta-paths and alleviates the excessive dependence of a deep learning model on the data set size. Finally, the DNN classification model is used to learn and train the generated fusion features, and the detection and classification of malware are realized.

According to the method of detecting Android malware based on the heterogeneous graph proposed by the embodiment of the present disclosure, a target heterogeneous graph is constructed according to entities and entity relationship information extracted from a sample to be tested, the meta-paths in which the KL distance between any two meta-paths is greater than a preset threshold are determined as a plurality of finally selected meta-paths, RBM feature fusion is carried out on the plurality of meta-paths, fusion parameters of initial fusion vectors are adjusted to meet a preset condition based on a preset automatic encoder to obtain a plurality of fusion feature vectors, a preset DNN classification training strategy is used to study and train the plurality of fusion feature vectors to obtain a final classification result, and Android malware detection is carried out according to the final classification result. Therefore, the problems that the malware detection method in the related technology cannot acquire deep semantics intentionally hidden and evolved, it is difficult to effectively detect the varied malware, the entity relationship has a low correlation with the malicious behavior, and missed detection or false detection are easy to occur are solved. Malware is detected and classified, and the speed and accuracy of identifying malware are improved.

Next, the apparatus of detecting Android malware based on the heterogeneous graph according to an embodiment of the present disclosure is described with reference to the attached drawings.

Figure 5:
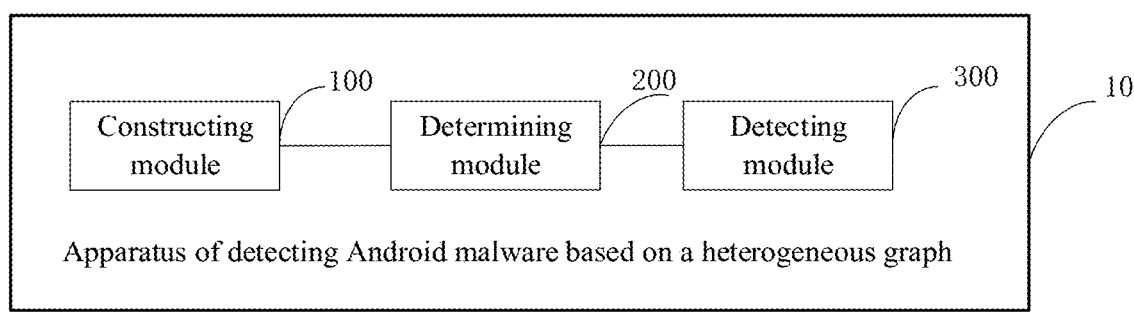
FIG. 5 is a block diagram of an apparatus of detecting Android malware based on a heterogeneous graph according to an embodiment of the present disclosure.

FIG. 5 is a block diagram of an apparatus of detecting Android malware based on a heterogeneous graph according to an embodiment of the present disclosure.

As shown in FIG. 5, the apparatus of detecting Android malware 10 based on the heterogeneous graph includes a constructing module 100, a determining module 200 and a detecting module 300.

The constructing module 100 is configured to acquire a sample to be tested, and construct a target heterogeneous graph according to entities and entity relationship information extracted from the sample to be tested; the determining module 200 is configured to determine a Kullback-Leibler (KL) distance between any two meta-paths based on the target heterogeneous graph, and take the meta-paths in which the KL distance between any two meta-paths is greater than a preset threshold as a plurality of finally selected meta-paths; the detecting module 300 is configured to carry out Restricted Boltzmann Machine (RBM) feature fusion on the plurality of meta-paths, and adjust fusion parameters of initial fusion vectors to meet a preset condition based on a preset automatic encoder to obtain a plurality of fusion feature vectors, use a preset Deep Neural Network (DNN) classification training strategy to study and train the plurality of fusion feature vectors to obtain a final classification result, and carry out Android malware detection according to the final classification result.

Optionally in some embodiments, the constructing module 100 is further configured to decode and/or decompile the sample to be tested to obtain a smali file and an AndroidManifest.xml configuration file; based on a preset regular matching strategy, extract Application Programming Interface (API) entities and information of packages to which each API entity belongs from the smali file, and extract hardware entity information and permission entity information declared by software from the AndroidManifest.xml configuration file by matching uses-feature and uses-permission; construct the target heterogeneous graph based on the API entities, the information of packages to which each API entity belongs, hardware entity information and permission entity information.

Optionally in some embodiments, the determining module 200 is further configured to calculate a transition probability of a first meta-path and a transition probability of a second meta-path in any two meta-paths based on a preset transition probability calculation formula; calculate the KL distance between any two meta-paths according to the transition probability of the first meta-path and the transition probability of the second meta-path based on a preset KL distance calculation formula.

Optionally in some embodiments, the preset transition probability calculation formula is:

$$P_{xy} = \frac{\exp(S_{xy}^m)}{\sum_{k=1}^{n} \exp(S_{xk}^m)}, x \neq y,$$

where x and y are both target nodes, $$S_{xy}^m = \frac{2 \times |\mathcal{P}_{xy}^{(m)}|}{|\mathcal{P}_{xx}^{(m)}| + |\mathcal{P}_{yy}^{(m)}|}, |\mathcal{P}_{xy}^{(m)}|$$

is the number of meta-paths m between two peer objects x and y, and n and k are both positive integers.

The preset KL distance calculation formula is:

$$KL(p_x \| q_x) = \sum_{x \neq y} p_{xy} \log \frac{p_{xy}}{q_{xy}},$$

where $q_x$ denotes the probability distribution of the first meta-path, $q_x=[q_{x1}, q_{x2}, \ldots, q_{xn}]^T$, and $p_x$ denotes the probability distribution of the second meta-path, $p_x=[p_{x1}, p_{x2}, \ldots, p_{xn}]^T$.

Optionally in some embodiments, the preset condition is:

$$\min \text{Loss} = \sum_{i=1}^{n} |x_{\mathcal{P}_i}^{(0)} - x_{\mathcal{P}_i}^{(reconstruct)}|_2^2,$$

where $x_{\mathcal{P}_i}^{(0)}$ is an original layer feature vector, and $x_{\mathcal{P}_i}^{(reconstruct)}$ is a feature vector reconstructed and decoded by the automatic encoder.

It should be noted that the above explanation of the embodiment of the method of detecting Android malware based on the heterogeneous graph is also applicable to the apparatus of detecting Android malware based on the heterogeneous graph of this embodiment, which will not be described in detail here.

According to the apparatus of detecting Android malware based on the heterogeneous graph proposed by the embodiment of the present disclosure, a target heterogeneous graph is constructed according to entities and entity relationship information extracted from a sample to be tested, the meta-paths in which the KL distance between any two meta-paths is greater than a preset threshold are determined as a plurality of finally selected meta-paths, RBM feature fusion is carried out on the plurality of meta-paths, fusion parameters of initial fusion vectors are adjusted to meet a preset condition based on a preset automatic encoder to obtain a plurality of fusion feature vectors, a preset DNN classification training strategy is used to study and train the plurality of fusion feature vectors to obtain a final classification result, and Android malware detection is carried out according to the final classification result. Therefore, the problems that the malware detection method in the related technology cannot acquire deep semantics intentionally hidden and evolved, it is difficult to effectively detect the varied malware, the entity relationship has a low correlation with the malicious behavior, and missed detection or false detection are easy to occur are solved. Malware is detected and classified, and the speed and accuracy of identifying malware are improved.

Figure 6:
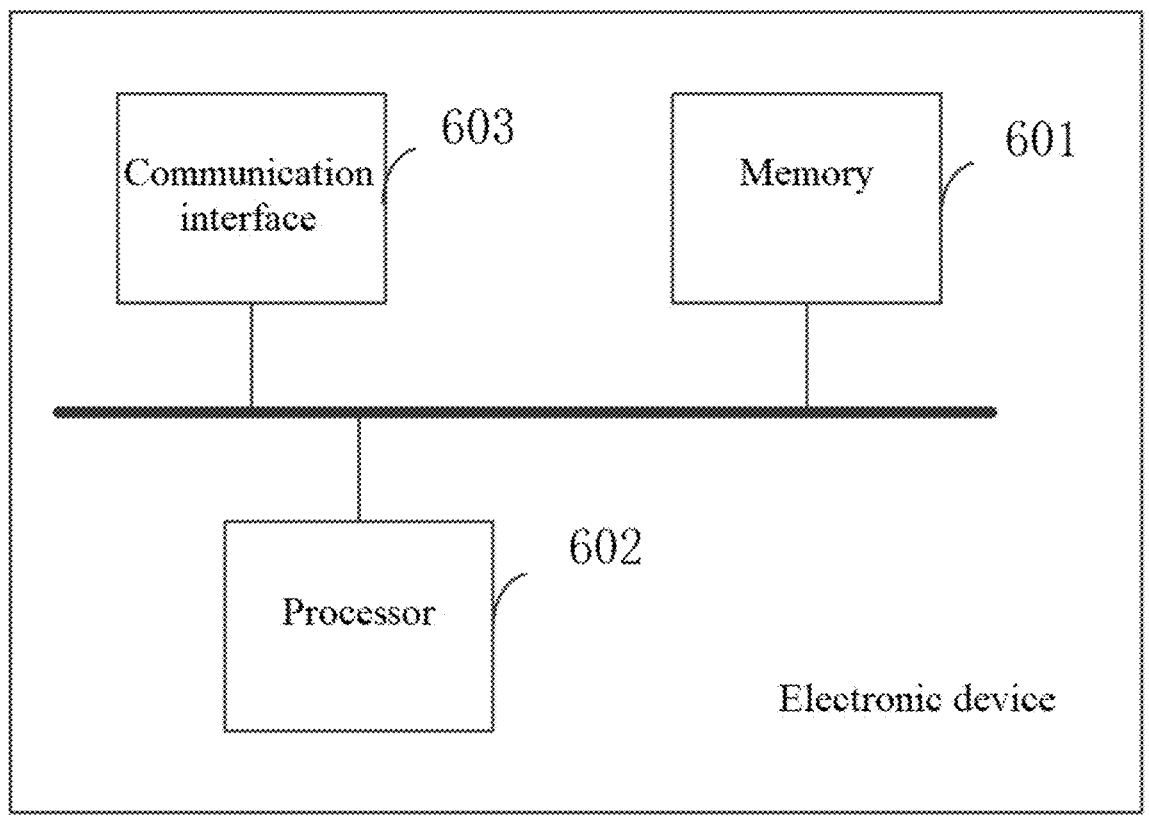
FIG. 6 is a structural schematic diagram of an electronic device according to an embodiment of the present disclosure.

FIG. 6 is a schematic structural diagram of an electronic device according to an embodiment of the present disclosure. The electronic device may include:

a memory 601, a processor 602 and a computer program stored in the memory 601 and operable on the processor 602.

When executing the program, the processor 602 implements the method of detecting Android malware based on the heterogeneous graph provided in the embodiment described above.

Further, the electronic device further includes:

a communication interface 603, which is configured to carry out communication between the memory 601 and the processor 602.

The memory 601 is configured to store computer programs operable on the processor 602.

The memory 601 may include a high-speed Random Access Memory (RAM) memory or a non-volatile memory, such as at least one disk memory.

If the memory 601, the processor 602, and the communication interface 603 are independently implemented, the communication interface 603, the memory 601 and the processor 602 can be connected to each other through a bus and complete communication with each other. The bus can be an Industry Standard Architecture (ISA) bus, a Peripheral Component Interconnect (PCI) bus or an Extended Industry Standard Architecture (EISA) bus. The bus can be classified into an address bus, a data bus and a control bus, etc. For convenience of presentation, only one thick line is used in FIG. 6, but it does not mean that there is only one bus or one type of buses.

Optionally, in the specific implementation, if the memory 601, the processor 602 and the communication interface 603 are integrated on one chip, the memory 601, the processor 602 and the communication interface 603 can communicate with each other through an internal interface.

The processor 602 may be a Central Processing Unit (CPU), or an Application Specific Integrated Circuit (ASIC), or one or more integrated circuits configured to implement the embodiment of the present disclosure.

The embodiment of the present disclosure further provides a non-transitory computer-readable storage medium on which a computer program is stored, where the program, when executed by a processor, implements the method of detecting Android malware based on the heterogeneous graph described above.

In the description of this specification, references to the terms "one embodiment", "some embodiments", "examples", "specific examples" or "some examples" mean that specific features, structures, materials or characteristics described in conjunction with this embodiment or example are included in at least one embodiment or example of the present disclosure. In this specification, the schematic expressions of the above terms are not necessarily aimed at the same embodiment or example. Moreover, the specific features, structures, materials or characteristics described can be combined in any one or N embodiments or examples in a suitable manner. In addition, those skilled in the art can incorporate and combine different embodiments or examples and features of different embodiments or examples described in this specification without contradicting each other.

In addition, the terms "first" and "second" are only used for descriptive purposes, and cannot be understood as indicating or implying relative importance or implicitly indicating the number of indicated technical features. Therefore, the features defined as "first" and "second" can explicitly or implicitly include at least one of these features. In the description of the present disclosure, the meaning of "N" is at least two, such as two, three, etc., unless otherwise specifically defined.

Any process or method description in the flowchart or otherwise described herein can be understood as a module, segment or part of codes of executable instructions including one or N steps for implementing customized logic functions or processes, and the scope of preferred embodiments of the present disclosure includes other implementations, in which functions can be performed out of the order shown or discussed, including in a substantially simultaneous manner or in the reverse order according to the functions involved, which should be understood by those skilled in the art to which the embodiment of the present disclosure belongs.

The logic and/or steps represented in the flowchart or described in other ways herein, for example, can be regarded as a sequenced list of executable instructions for implementing logical functions, and can be embodied in any computer-readable medium for use by an instruction execution system, an instruction execution apparatus or an instruction execution device (such as a computer-based system, a system including a processor or other systems that can extract instructions from and execute instructions from the instruction execution system, the instruction execution apparatus or the instruction execution device) or in combination with an instruction execution system, an instruction execution apparatus or an instruction execution device. For the purposes of this specification, a "computer-readable medium" can be any apparatus that can contain, store, communicate, propagate or transmit a program for use by the instruction execution system, the instruction execution apparatus or the instruction execution device or in combination with the instruction execution system, the instruction execution apparatus or the instruction execution device. More specific examples of the computer-readable medium (a non-exhaustive list) include the following: an electrical connection part (electronic device) with one or N wires, a portable computer disk box (magnetic device), a Random Access Memory (RAM), a Read-Only Memory (ROM), an Erasable And Editable Read-Only Memory (EPROM or flash memory), an optical fiber device, and a portable compact disk read only memory (CDROM). In addition, the computer-readable medium may even be paper or other suitable medium on which the program can be printed, because the program can be obtained electronically by, for example, optically scanning the paper or other medium, followed by editing, interpreting or processing the paper or other medium in other suitable manners if necessary, and then stored in a computer memory.

It should be understood that various parts of the present disclosure can be implemented in hardware, software, firmware or a combination thereof. In the above embodiments, N steps or methods can be implemented by software or firmware stored in the memory and executed by an appropriate instruction execution system. For example, if the steps or methods are implemented by hardware, as in another embodiment, the steps or methods can be implemented by any one of the following technologies known in the art or the combination thereof: discrete logic circuits with logic gates for implementing logic functions on data signals, application specific integrated circuits with appropriate combinational logic gates, Programmable Gate Arrays (PGA), Field Programmable Gate Arrays (FPGA), etc.

Those skilled in the art can understand that all or part of the steps carried by the above embodiment method can be completed by instructing related hardware through a program. The program can be stored in a non-transitory computer-readable storage medium, and the program, when executed, includes one or a combination of the steps of the method embodiment.

In addition, each functional unit in each embodiment of the present disclosure can be integrated in one processing module, or each unit can exist physically alone, or two or more units can be integrated in one module. The above integrated modules can be implemented in the form of hardware or software functional modules. The integrated module can also be stored in a non-transitory computer-readable storage medium if it is implemented in the form of a software functional module and sold or used as an independent product.

The storage medium mentioned above can be a read-only memory, a magnetic disk or an optical disk, etc. Although the embodiments of the present disclosure have been shown and described above, it can be understood that the above embodiments are exemplary and cannot be understood as limitations of the present disclosure, and those skilled in the art can make changes, modifications, substitutions and variations to the above embodiments within the scope of the present disclosure.

What is claimed is:

1. A method of detecting Android malware based on a heterogeneous graph, comprising: acquiring an application to be tested, and constructing a target heterogeneous graph according to entities and entity relationship information extracted from the application to be tested by decoding and/or decompiling the application to be tested to obtain a smali file and an AndroidManifest.xml configuration file; based on a preset regular matching strategy, extracting Application Programming Interface (API) entities and information of packages to which each API entity belongs from the smali file, and extracting hardware entity information and permission entity information declared by software from the AndroidManifest.xml configuration file by matching uses-feature and uses-permission; constructing the target heterogeneous graph based on the API entities, the information of packages to which each API entity belongs, the hardware entity information and the permission entity information; determining a Kullback-Leibler (KL) distance between any two meta-paths based on the target heterogeneous graph, and taking the meta-paths in which the KL distance between any two meta-paths is greater than a preset threshold as a plurality of finally selected meta-paths; carrying out, by Restricted Boltzmann Machine (RBM), feature fusion on the plurality of meta-paths, and adjusting, by an automatic encoder, fusion parameters of initial fusion vectors to meet a predetermined condition to obtain a plurality of fusion feature vectors; inputting the plurality of fusion feature vectors into a trained Deep Neural Network (DNN) for classification to obtain a final classification result, and determining whether the application to be tested is Android malware according to the final classification result.

2. The method according to claim 1, wherein the determining a KL distance between any two meta-paths comprises:
calculating a transition probability of a first meta-path and a transition probability of a second meta-path in any two meta-paths based on a preset transition probability calculation formula; and
calculating the KL distance between any two meta-paths according to the transition probability of the first meta-path and the transition probability of the second meta-path based on a preset KL distance calculation formula.

3. The method according to claim 2, wherein the preset transition probability calculation formula is:

$$P_{xy} = \frac{\exp(S_{xy}^m)}{\sum_{k=1}^{n} \exp(S_{xk}^m)}, x \neq y$$

wherein x and y are both target nodes, $$S_{xy}^m = \frac{2 \times |\mathcal{P}_{xy}^{(m)}|}{|\mathcal{P}_{xx}^{(m)}| + |\mathcal{P}_{yy}^{(m)}|}, |\mathcal{P}_{xy}^{(m)}|$$

is a number of meta-paths m between two peer objects x and y, and n and k are both positive integers, the preset KL distance calculation formula is:

$$KL(p_x\|q_x) = \sum_{x \neq y} p_{xy} \log \frac{p_{xy}}{q_{xy}}$$

wherein $q_x$ denotes the probability distribution of the first meta-path, $q_x=[q_{x1}, q_{x2}, \ldots, q_{xn}]^T$, and $p_x$ denotes the probability distribution of the second meta-path, $p_x=[p_{x1}, p_{x2}, \ldots, p_{xn}]^T$.

4. The method according to claim 1, wherein the preset condition is:

$$\min \text{Loss} = \sum_{i=1}^{n} |x_{\mathcal{P}_i}^{(0)} - x_{\mathcal{P}_i}^{(reconstruct)}|_2^2$$

wherein $x_{\mathcal{P}_i}^{(0)}$ is an original layer feature vector, and $x_{\mathcal{P}_i}^{(reconstruct)}$ is a feature vector reconstructed and decoded by the automatic encoder.

5. An apparatus of detecting Android malware based on a heterogeneous graph, comprising: a constructing module implemented by a processor, which is configured to acquire an application to be tested, and construct a target heterogeneous graph according to entities and entity relationship information extracted from the application to be tested by decoding and/or decompiling the application to be tested to obtain a smali file and an AndroidManifest.xml configuration file; based on a preset regular matching strategy, extracting Application Programming Interface (API) entities and information of packages to which each API entity belongs from the smali file, and extract hardware entity information and permission entity information declared by software from the AndroidManifest.xml configuration file by matching uses-feature and uses-permission; constructing the target heterogeneous graph based on the API entities, the information of packages to which each API entity belongs, the hardware entity information and the permission entity information; a determining module implemented by a processor, which is configured to determine a Kullback-Leibler (KL) distance between any two meta-paths based on the target heterogeneous graph, and take the meta-paths in which the KL distance between any two meta-paths is greater than a preset threshold as a plurality of finally selected meta-paths; and a detecting module implemented by a procesor, which is configured to carry out, by Restricted Boltzmann Machine (RBM)$_a$ feature fusion on the plurality of meta-paths, and adjust, by an automatic encoder, fusion parameters of initial fusion vectors to meet a predetermined condition to obtain a plurality of fusion feature vectors; input the plurality of fusion feature vectors into a trained Deep Neural Network (DNN) for classification to obtain a final classification result, and determine whether the application to be tested is Android malware according to the final classification result.

6. The apparatus according to claim 5, wherein the determining module is further configured to:

calculate a transition probability of a first meta-path and a transition probability of a second meta-path in any two meta-paths based on a preset transition probability calculation formula; and calculate the KL distance between any two meta-paths according to the transition probability of the first meta-path and the transition probability of the second meta-path based on a preset KL distance calculation formula.

7. An electronic device, comprising a memory, a processor and a computer program stored in the memory and operable on the processor, wherein the processor executes the program to implement the method of detecting Android malware based on the heterogeneous graph according to claim 1.

8. A non-transitory computer-readable storage medium, on which a computer program is stored, wherein the program is executed by a processor to implement the method of detecting Android malware based on the heterogeneous graph according to claim 1.

9. The method according to claim 1, wherein the trained DNN is trained as follows:

acquiring a plurality of application samples, and constructing target heterogeneous graphs according to entities and entity relationship information extracted from the application samples;

determining a Kullback-Leibler (KL) distance between any two meta-paths based on the target heterogeneous graphs, and taking the meta-paths in which the KL distance between any two meta-paths is greater than a preset threshold as a plurality of finally selected meta-paths;

carrying out, by Restricted Boltzmann Machine (RBM), feature fusion on the plurality of meta-paths, and adjusting, by an automatic encoder, fusion parameters of initial fusion vectors to meet a predetermined condition to obtain a plurality of fusion feature vectors, training a DNN with the plurality of fusion feature vectors based on a predetermined classification training strategy to obtain the trained DNN.

10. The electronic device according to claim 7, wherein the constructing a target heterogeneous graph according to entities and entity relationship information extracted from the application to be tested comprises:

decoding and/or decompiling the application to be tested to obtain a smali file and an AndroidManifest.xml configuration file;

based on a preset regular matching strategy, extracting Application Programming Interface (API) entities and information of packages to which each API entity belongs from the smali file, and extracting hardware entity information and permission entity information declared by software from the AndroidManifest.xml configuration file by matching uses-feature and uses-permission; and constructing the target heterogeneous graph based on the API entities, the information of packages to which each API entity belongs, the hardware entity information and the permission entity information.

11. The electronic device according to claim 7, wherein the determining a KL distance between any two meta-paths comprises:

calculating a transition probability of a first meta-path and a transition probability of a second meta-path in any two meta-paths based on a preset transition probability calculation formula; and calculating the KL distance between any two meta-paths according to the transition probability of the first meta-path and the transition probability of the second meta-path based on a preset KL distance calculation formula.

12. The electronic device according to claim 7, wherein the preset transition probability calculation formula is:

$$P_{xy} = \frac{\exp(S_{xy}^m)}{\sum_{k=1}^{n} \exp(S_{xk}^m)}, x \neq y$$

wherein x and y are both target nodes, $$S_{xy}^m = \frac{2 \times |\mathcal{P}_{xy}^{(m)}|}{|\mathcal{P}_{xx}^{(m)}| + |\mathcal{P}_{yy}^{(m)}|}, |\mathcal{P}_{xy}^{(m)}|$$

is a number of meta-paths m between two peer objects x and y, and n and k are both positive integers, the preset KL distance calculation formula is:

$$KL(p_x||q_x) = \sum_{x \neq y} p_{xy} \log \frac{p_{xy}}{q_{xy}}$$

wherein $q_x$ denotes the probability distribution of the first meta-path, $q_x = [q_{x1}, q_{x2}, \ldots, q_{xn}]^T$, and $p_x$ denotes the probability distribution of the second meta-path $p_x = [p_{x1}, p_{x2}, \ldots, p_{xn}]^T$.

13. The electronic device according to claim 7, wherein the preset condition is:

$$\min Loss = \sum_{i=1}^{n} |x_{\mathcal{P}_i}^{(0)} - x_{\mathcal{P}_i}^{(reconstruct)}|_2^2$$

wherein $x_{\mathcal{P}_i}^{(0)}$ is an original layer feature vector, and $x_{\mathcal{P}_i}^{(reconstruct)}$ is a feature vector reconstructed and decoded by the automatic encoder.

14. The non-transitory computer-readable storage medium according to claim 8, wherein the constructing a target heterogeneous graph according to entities and entity relationship information extracted from the application to be tested comprises:
   decoding and/or decompiling the application to be tested to obtain a smali file and an AndroidManifest.xml configuration file;
   based on a preset regular matching strategy, extracting Application Programming Interface (API) entities and information of packages to which each API entity belongs from the smali file, and extracting hardware entity information and permission entity information declared by software from the AndroidManifest.xml configuration file by matching uses-feature and uses-permission; and
   constructing the target heterogeneous graph based on the API entities, the information of packages to which each API entity belongs, the hardware entity information and the permission entity information.

15. The non-transitory computer-readable storage medium according to claim 8, wherein the determining a KL distance between any two meta-paths comprises:
   calculating a transition probability of a first meta-path and a transition probability of a second meta-path in any two meta-paths based on a preset transition probability calculation formula; and
   calculating the KL distance between any two meta-paths according to the transition probability of the first meta-path and the transition probability of the second meta-path based on a preset KL distance calculation formula.

16. The non-transitory computer-readable storage medium according to claim 8, wherein the preset transition probability calculation formula is:

$$P_{xy} = \frac{\exp(S_{xy}^m)}{\sum_{k=1}^{n} \exp(S_{xk}^m)}, x \neq y$$

wherein x and y are both target nodes, $$S_{xy}^m = \frac{2 \times |\mathcal{P}_{xy}^{(m)}|}{|\mathcal{P}_{xx}^{(m)}| + |\mathcal{P}_{yy}^{(m)}|}, |\mathcal{P}_{xy}^{(m)}|$$

is a number of meta-paths m between two peer objects x and y, and n and k are both positive integers, the preset KL distance calculation formula is:

$$KL(p_x||q_x) = \sum_{x \neq y} p_{xy} \log \frac{p_{xy}}{q_{xy}}$$

wherein $q_x$ denotes the probability distribution of the first meta-path, $q_x = [q_{x1}, q_{x2}, \ldots, q_{xn}]^T$, and $p_x$ denotes the probability distribution of the second meta-path $p_x = [p_{x1}, p_{x2}, \ldots, p_{xn}]^T$.

17. The non-transitory computer-readable storage medium according to claim 10, wherein the preset condition is:

$$\min Loss = \sum_{i=1}^{n} |x_{\mathcal{P}_i}^{(0)} - x_{\mathcal{P}_i}^{(reconstruct)}|_2^2$$

wherein $x_{\mathcal{P}_i}^{(0)}$ is an original layer feature vector, and $x_{\mathcal{P}_i}^{(reconstruct)}$ is a feature vector reconstructed and decoded by the automatic encoder.

* * * * *